United States Patent
Ohashi et al.

(10) Patent No.: US 12,155,281 B2
(45) Date of Patent: Nov. 26, 2024

(54) MOTOR-INTEGRATED FLUID MACHINE INCLUDING ROTATABLE RING WITH MAGNETS AND RESTRAINER PART, AND VERTICAL TAKE-OFF AND LANDING AIRCRAFT

(71) Applicant: MITSUBISHI HEAVY INDUSTRIES, LTD., Tokyo (JP)

(72) Inventors: Kazuki Ohashi, Tokyo (JP); Naoaki Fujiwara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 251 days.

(21) Appl. No.: 17/762,245

(22) PCT Filed: Jul. 7, 2020

(86) PCT No.: PCT/JP2020/026531
§ 371 (c)(1),
(2) Date: Mar. 21, 2022

(87) PCT Pub. No.: WO2021/059665
PCT Pub. Date: Apr. 1, 2021

(65) Prior Publication Data
US 2022/0345017 A1    Oct. 27, 2022

(30) Foreign Application Priority Data
Sep. 26, 2019   (JP) .................... 2019-175289

(51) Int. Cl.
*H02K 21/00*      (2006.01)
*B64C 27/20*      (2023.01)
(Continued)

(52) U.S. Cl.
CPC ............. *H02K 21/14* (2013.01); *B64C 27/20* (2013.01); *B64C 29/0016* (2013.01);
(Continued)

(58) Field of Classification Search
CPC ............ H02K 1/30; H02K 1/278; H02K 1/27; H02K 1/2786; H02K 1/2753; H02K 1/274;
(Continued)

(56) References Cited

U.S. PATENT DOCUMENTS 3,132,270 A * 5/1964 Phelon ................. H02K 1/2791
                                                    310/156.31
3,258,623 A * 6/1966 Phelon ................. H02K 1/2791
                                                    310/156.19
(Continued)

FOREIGN PATENT DOCUMENTS

| CN | 105270594 | 1/2016 |
| EP | 0 566 788 | 10/1993 |

(Continued)

OTHER PUBLICATIONS

International Search Report issued Sep. 15, 2020 in International (PCT) Application No. PCT/JP2020/026531.
(Continued)

*Primary Examiner* — Maged M Almawri
(74) *Attorney, Agent, or Firm* — Wenderoth, Lind & Ponack, L.L.P.

(57) ABSTRACT

A motor-integrated fluid machine includes a rotatable part configured to rotate around a rotation axis; an outer peripheral part at an outer periphery of the rotatable part; a motor configured to provide power from the outer peripheral part to rotate the rotatable part; and a restrainer part. The rotatable part includes a support ring around the rotation axis, and blades on a center side of the support ring. The blades are side by side in a circumferential direction. The motor includes a rotor side magnet on an outer peripheral side of the support ring in a radial direction, and a stator side magnet on an inner peripheral side of the outer peripheral part to face the rotor side magnet. The restrainer part is configured to restrain the support ring and the rotor side magnet from
(Continued)

outside to integrate the support ring and the rotor side magnet.

8 Claims, 4 Drawing Sheets

(51) Int. Cl.
  *B64C 29/00* (2006.01)
  *B64D 27/24* (2006.01)
  *B64U 10/20* (2023.01)
  *H02K 1/30* (2006.01)
  *H02K 21/14* (2006.01)
  *B64U 30/20* (2023.01)

(52) U.S. Cl.
  CPC ............. *B64D 27/24* (2013.01); *B64U 10/20* (2023.01); *H02K 1/30* (2013.01); *B64U 30/20* (2023.01)

(58) Field of Classification Search
  CPC ........ H02K 1/279; H02K 1/2792; H02K 1/28; H02K 1/2791; H02K 21/14; H02K 21/22; H02K 21/222; H02K 7/183; H02K 7/1838; H02K 7/1846; Y02E 10/725; Y02E 10/721; B64C 29/0016; B64C 27/12; B64C 27/20; B64C 29/00; B64C 29/321; B64D 27/24; B63H 1/16; B60V 1/14
  USPC .. 310/68 B, 156.08–156.15, 156.28, 156.29, 310/156.38, 156.43, 156.45, 154.13, 310/156.01, 156.03, 156.12, 156.21, 310/156.22, 156.23, 156.31, 156.42, 310/156.55
  See application file for complete search history.

(56) References Cited

U.S. PATENT DOCUMENTS

| | | | | |
|---|---|---|---|---|
| 3,581,394 A * | 6/1971 | Phelon | ................. | H02K 1/2791 310/156.31 |
| 3,657,582 A * | 4/1972 | Phelon | ................. | H02K 1/2791 310/216.057 |
| 4,137,884 A * | 2/1979 | Odazima | ............ | H02K 1/27915 123/149 D |
| 4,219,752 A * | 8/1980 | Katou | ................. | H02K 1/2791 310/156.19 |
| 4,701,654 A * | 10/1987 | Tatukawa | ............ | H02K 1/2791 310/67 R |
| 5,220,231 A * | 6/1993 | Veronesi | ................ | H02K 5/225 310/90 |
| 6,452,301 B1 * | 9/2002 | Van Dine | ............. | H02K 1/2773 310/156.12 |
| 6,614,140 B2 * | 9/2003 | Uemura | ............... | H02K 1/2791 310/74 |
| 7,030,530 B2 * | 4/2006 | Malmberg | ............. | H02K 1/278 310/156.28 |
| 7,078,841 B2 * | 7/2006 | Yokota | .................... | H02K 9/06 310/153 |
| 7,709,987 B2 * | 5/2010 | Watanabe | ............ | H02K 1/2791 310/156.28 |
| 7,781,932 B2 * | 8/2010 | Jansen | ................. | H02K 1/2781 310/156.08 |
| 8,618,689 B2 * | 12/2013 | Casazza | .................. | F03D 80/70 290/55 |
| 9,071,104 B2 * | 6/2015 | Stiesdal | ............... | H02K 1/274 |
| 9,312,741 B2 * | 4/2016 | Pabst | ...................... | H02K 9/02 |
| 9,859,773 B2 * | 1/2018 | Yin | .......................... | H02K 1/28 |
| 10,468,927 B2 * | 11/2019 | Latulipe | .................. | H02K 1/28 |
| 11,760,496 B2 * | 9/2023 | Marcel | .................... | B64C 27/20 310/74 |
| 11,883,345 B2 * | 1/2024 | Marcel | .................. | G01C 21/18 |
| 2001/0017499 A1 * | 8/2001 | Kaneko | ................ | H02K 1/2766 310/156.28 |
| 2003/0186601 A1 | 10/2003 | Collier et al. | | |
| 2004/0020185 A1 * | 2/2004 | Brouillette | ................ | F02K 7/10 60/39.35 |
| 2004/0201299 A1 * | 10/2004 | Naritomi | .............. | H02K 21/185 123/149 D |
| 2006/0226724 A1 * | 10/2006 | Cullen | .................... | H02K 1/278 310/156.31 |
| 2007/0090710 A1 * | 4/2007 | Chen | ...................... | H02K 29/08 310/156.43 |
| 2007/0290564 A1 | 12/2007 | Clark | | |
| 2008/0042504 A1 * | 2/2008 | Thibodeau | ............ | F16C 39/063 310/90.5 |
| 2008/0278016 A1 * | 11/2008 | Sorachi | ................ | H02K 11/215 310/156.55 |
| 2009/0146517 A1 * | 6/2009 | Tresch | .................. | H02K 1/2781 310/156.28 |
| 2010/0052452 A1 * | 3/2010 | Yoshino | ............... | H02K 1/2795 310/156.01 |
| 2012/0112461 A1 * | 5/2012 | Saluccio | ................... | F03D 9/11 290/55 |
| 2012/0201703 A1 | 8/2012 | Tanaka et al. | | |
| 2014/0333167 A1 * | 11/2014 | Akamatsu | ............ | H02K 1/2791 310/153 |
| 2015/0256056 A1 * | 9/2015 | Kim | ......................... | H02K 5/08 310/71 |
| 2016/0006305 A1 * | 1/2016 | Chiu | ...................... | H02K 1/278 310/156.29 |
| 2016/0190881 A1 * | 6/2016 | Kanatani | ................ | H02K 11/33 310/156.01 |
| 2017/0104385 A1 * | 4/2017 | Salamon | ................. | B64C 11/12 |
| 2017/0320598 A1 * | 11/2017 | Bushroe | ................. | G01C 19/06 |
| 2018/0134358 A1 | 5/2018 | Walpurgis | | |
| 2019/0300165 A1 * | 10/2019 | Marcel | .................. | B64C 11/001 |

FOREIGN PATENT DOCUMENTS

| | | |
|---|---|---|
| EP | 1 309 069 | 5/2003 |
| JP | 2011-5926 | 1/2011 |

OTHER PUBLICATIONS

Extended European Search Report issued Sep. 8, 2023 in corresponding European Patent Application No. 20867047.1.

\* cited by examiner

MOTOR-INTEGRATED FLUID MACHINE INCLUDING ROTATABLE RING WITH MAGNETS AND RESTRAINER PART, AND VERTICAL TAKE-OFF AND LANDING AIRCRAFT

TECHNICAL FIELD

The present invention relates to a motor-integrated fluid machine and a vertical takeoff and landing aircraft.

BACKGROUND ART

In the related art, a thrust generator has been known which includes a stator having an annular shape; a rotor having an annular shape that is provided inside the stator to be rotatable with respect to the stator; and a propeller member provided inside the rotor (for example, refer to Japanese Unexamined Patent Application Publication No. 2011-5926). A coil is provided on an inner peripheral side of the stator, and a permanent magnet is provided on an outer peripheral side of the rotor.

SUMMARY OF INVENTION

Technical Problem

A centrifugal force toward an outside in a radial direction is applied to the rotor in rotation. In general, a rotor side magnet such as the permanent magnet provided on the outer peripheral side of the rotor is bonded to the rotor with an adhesive agent, or is integrated with the rotor by forming a locking part in the rotor side magnet and locking the locking part to the rotor. However, since the rotor side magnet has a heavy specific gravity, and the rotor rotates at high speed, a large centrifugal force is applied to the rotor side magnet. When a large centrifugal force is applied to the rotor side magnet, it is difficult to obtain a sufficient load capacity at a joining part between the rotor and the rotor side magnet with the adhesive agent or the locking part, design is difficult to carry out.

An object of the present invention to provide a motor-integrated fluid machine and a vertical takeoff and landing aircraft in which a sufficient load capacity can be obtained even when a centrifugal force is applied.

Solution to Problem

According to an aspect of the present invention, there is provided a motor-integrated fluid machine in which a motor is integrally provided, the machine including: a rotating part that rotates around a rotation axis; an outer peripheral part provided at an outer periphery of the rotating part; and an outer peripheral drive motor that provides power from the outer peripheral part to rotate the rotating part. The rotating part includes a rotating support ring formed in an annular shape around the rotation axis, and a plurality of blades that are provided on a center side of the rotating support ring, and that are provided side by side in a circumferential direction of the rotation axis. The motor includes a rotor side magnet provided on an outer peripheral side of the rotating support ring in a radial direction, and a stator side magnet provided on an inner peripheral side of the outer peripheral part to face the rotor side magnet. A restraining part is provided which covers and restrains the rotating support ring and the rotor side magnet from an outside to integrate the rotating support ring and the rotor side magnet.

In addition, according to another aspect of the present invention, there is provided a vertical takeoff and landing aircraft including: the motor-integrated fluid machine; and an airframe that is moved by thrust generated from the motor-integrated fluid machine.

Advantageous Effects of Invention

According to the present invention, a sufficient load capacity can be obtained even when a centrifugal force is applied.

DESCRIPTION OF EMBODIMENTS

Hereinafter, embodiments according to the present invention will be described in detail with reference to the drawings. Incidentally, the invention is not limited by the embodiments. In addition, the components in the following embodiments include components that can be easily replaced by those skilled in the art, or components that are substantially the same. Further, the components to be described below can be appropriately combined, and when there are a plurality of embodiments, the embodiments can be combined.

First Embodiment

A motor-integrated fluid machine according to a first embodiment is an axial fluid machine. The motor-integrated fluid machine is a motor-integrated fan 1 (hereinafter, also simply referred to as a fan 1) that takes in air from a suction port and discharges the air from a discharge outlet, thus to generate thrust. Incidentally, in the first embodiment, the motor-integrated fan 1 will be described as an application of the motor-integrated fluid machine, and the motor-integrated fluid machine is not limited to the configuration. The motor-integrated fluid machine may be applied, for example, as a motor-integrated thruster such as a propeller which takes in a liquid such as water or seawater from a suction port to inject the liquid from a discharge outlet, thus to generate thrust.

(Motor-Integrated Fan)

The motor-integrated fan 1 is provided in, for example, a vertical takeoff and landing aircraft such as a helicopter or a drone. The motor-integrated fan 1 provided in the vertical takeoff and landing aircraft generates thrust for lifting an airframe, or generates thrust for controlling the posture of the airframe. Incidentally, the motor-integrated fan 1 may be applied to, for example, an air cushion vehicle such as a hovercraft. Further, when the motor-integrated fan 1 is applied as a motor-integrated thruster, the motor-integrated fan 1 may be applied to ships.

Figure 1:
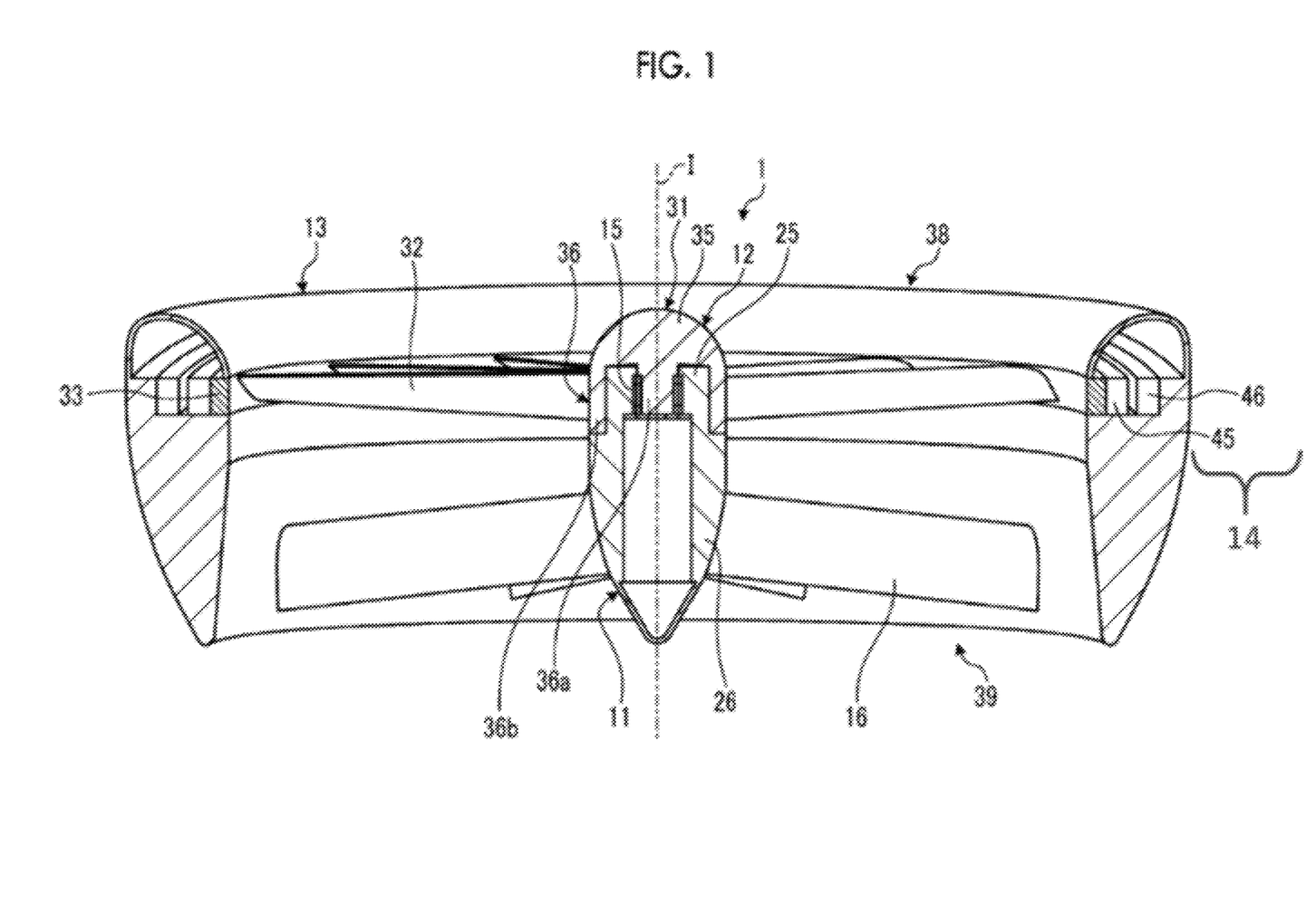
FIG. 1 is a cross-sectional view of a motor-integrated fan according to a first embodiment.
Figure 2:
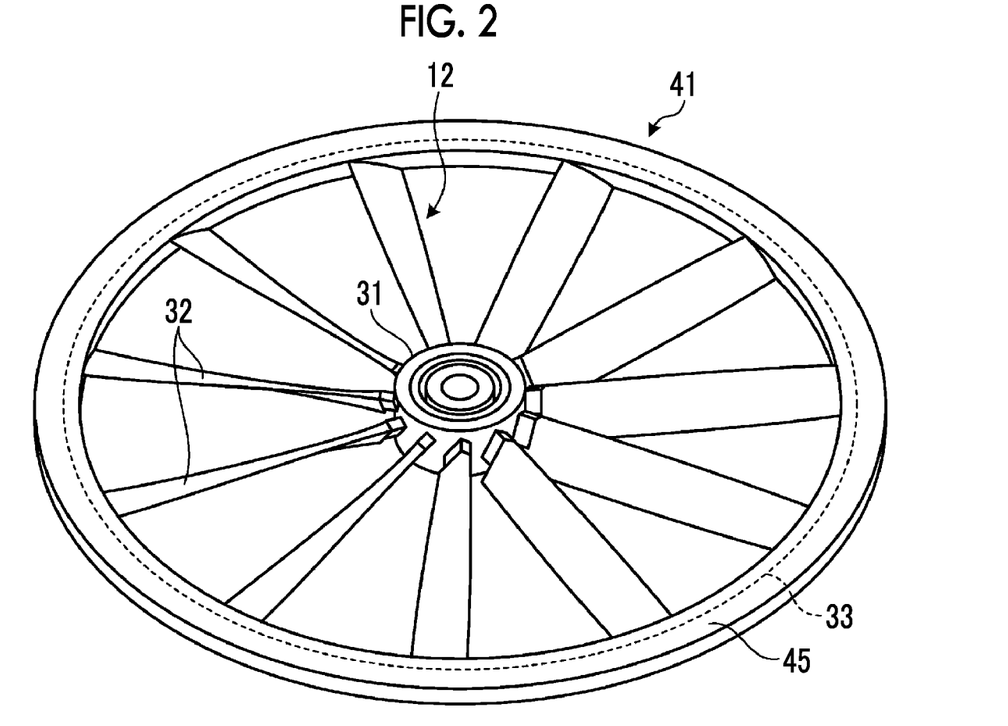
FIG. 2 is a perspective view of a fan blade according to the first embodiment.
Figure 3:
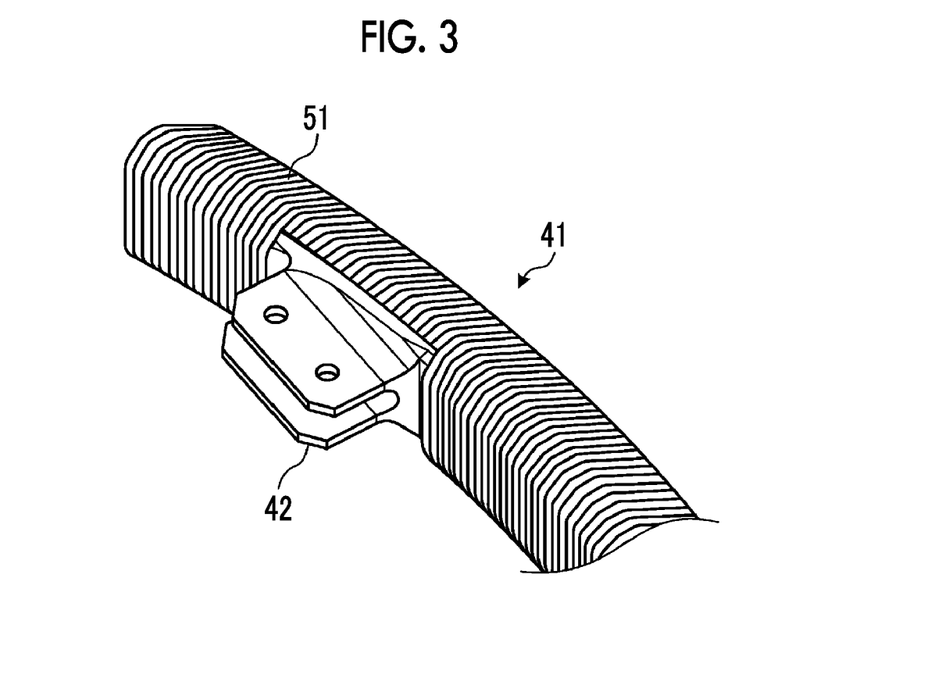
FIG. 3 is a partial perspective view illustrating a part of the fan blade according to the first embodiment.
Figure 4:
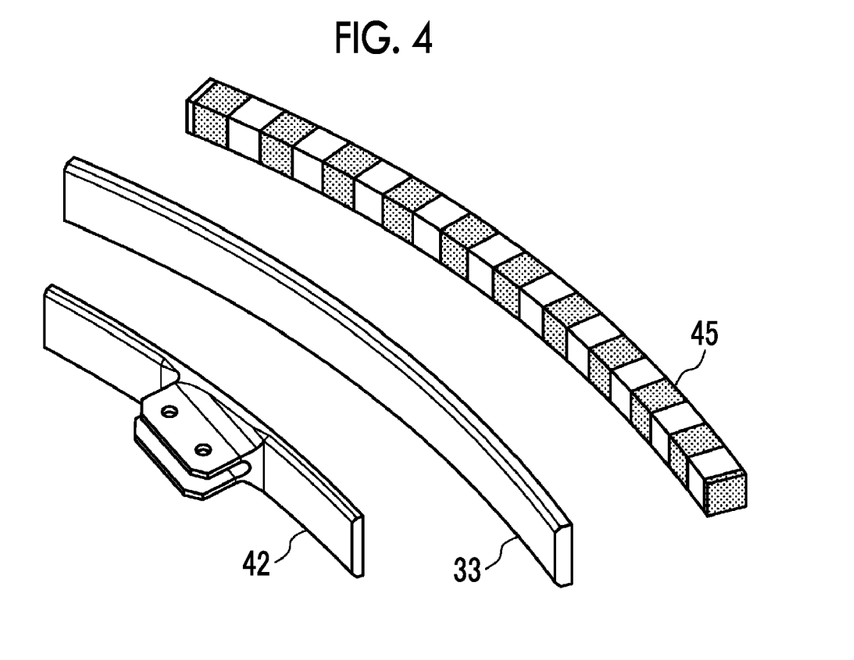
FIG. 4 is a description view illustrating a part of the fan blade according to the first embodiment.
Figure 5:
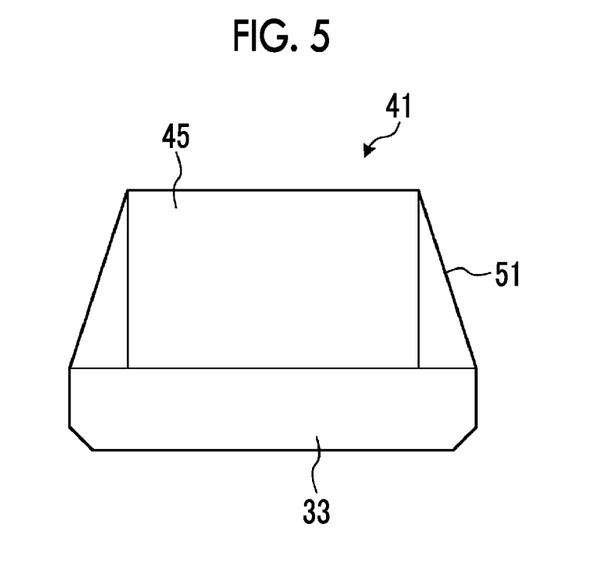
FIG. 5 is a cross-sectional view of the fan blade according to the first embodiment.

The motor-integrated fan 1 will be described with reference to FIGS. 1 to 5. FIG. 1 is a cross-sectional view of the motor-integrated fan according to the first embodiment. FIG. 2 is a perspective view of a fan blade according to the first embodiment. FIG. 3 is a partial perspective view illustrating a part of the fan blade according to the first embodiment. FIG. 4 is a description view illustrating a part of the fan blade according to the first embodiment. FIG. 5 is a cross-sectional view of the fan blade according to the first embodiment.

The motor-integrated fan 1 is called a duct-type propeller or a duct fan. The motor-integrated fan 1 is used, for example, in a horizontal state where an axial direction is a vertical direction, and takes in air from an upper side in the vertical direction and discharges the air to a lower side in the vertical direction. Incidentally, the motor-integrated fan 1 may be used in a vertical state where the axial direction is a horizontal direction.

The motor-integrated fan 1 is a flat fan of which the length in the axial direction of the rotation axis I is shorter than the length in a radial direction of the rotation axis I. The motor-integrated fan 1 is a fan in which one motor is integrally provided, and includes a shaft part 11, a rotating part 12, an outer peripheral part 13, a motor 14, a rolling bearing 15, and a guide vane 16.

The shaft part 11 is provided at the center of the rotation axis I, and is a support system (fixed side). The axial direction of the rotation axis I is an upward and downward direction in FIG. 1, and is a direction along the vertical direction. For this reason, a flow direction of air is a direction along the axial direction of the rotation axis I, and the air flows from an upper side toward a lower side in FIG. 1. The shaft part 11 includes a shaft side fitting part 25 that is a part provided on an upstream side in the axial direction of the rotation axis I, and a shaft body 26 that is a part provided downstream of the shaft side fitting part 25.

A hub 31 of the rotating part 12 to be described later is fitted to the shaft side fitting part 25. The shaft side fitting part 25 has a cylindrical shape, and is provided to protrude from an end surface on the upstream side of the shaft body 26 in the axial direction. A space having a columnar shape is formed on a center side of the rotation axis I in the shaft side fitting part 25. A part of the hub 31 of the rotating part 12 is inserted into the space. In addition, an outer peripheral side of the shaft side fitting part 25 is surrounded by a part of the hub 31 of the rotating part 12.

The shaft body 26 has a substantially conical shape that is tapered from the upstream side toward a downstream side in the axial direction. For this reason, an outer peripheral surface of the shaft body 26 is a surface that extends from an outer side toward an inner side in the radial direction as the surface extends from the upstream side toward the downstream side in the axial direction. An internal space in which a device can be installed is formed inside the shaft body 26. Examples of the device include a control device, a camera and the like. In addition, an end part on the radial inner side of the guide vane 16 is connected to the outer peripheral surface of the shaft body 26.

As illustrated in FIGS. 1 and 2, the rotating part is a rotating system (rotating side) that rotates around the shaft part 11. The rotating part 12 is provided on an inlet side, into which air flows, with respect to the shaft part 11 in the axial direction of the rotation axis I. The rotating part 12 includes the hub 31, a plurality of blades 32, and a rotating support ring 33.

The hub 31 is provided upstream of the shaft part 11 in the axial direction, and is rotatably fitted to the shaft side fitting part 25. The hub 31 includes a hub body 35 that is a part provided on the upstream side in the axial direction, and a hub side fitting part 36 that is a part provided downstream of the hub body 35. The hub body 35 is formed such that an end surface on the upstream side is a hemispherical surface having a predetermined radius of curvature. The hub side fitting part 36 has a shape complementary to that of the shaft side fitting part 25. The hub side fitting part 36 includes a central shaft 36a provided at the center of the rotation axis, and a cylindrical part 36b that has a cylindrical shape and is provided on an outer peripheral side of the central shaft 36a. The central shaft 36a is inserted into the space of the shaft side fitting part 25, the space being formed at the center of the rotation axis. The cylindrical part 36b is provided to protrude from an end surface on the downstream side of the hub body 35 in the axial direction. The cylindrical part 36b is disposed to surround an outer periphery of the shaft side fitting part 25. At this time, the rolling bearing 15 is provided between an inner peripheral surface of the shaft side fitting part 25 and an outer peripheral surface of the central shaft 36a of the hub 31.

Then, a surface extending from an end surface of the hub body 35 to the outer peripheral surface of the shaft body 26 via an outer peripheral surface of the cylindrical part 36b is a surface that is smooth without a step.

The plurality of blades 32 are provided to extend from the hub 31 toward the radial outer side, and are provided side by side at predetermined intervals in a circumferential direction. Each of the blades 32 has an airfoil shape. The plurality of blades 32 are made of a composite material. Incidentally, in the present embodiment, the plurality of blades 32 are made of a composite material; however, the material is not particularly limited, and the plurality of blades 32 may be made of, for example, a metallic material.

The rotating support ring 33 is formed in an annular shape around the rotation axis I. The rotating support ring 33 is connected to an outer peripheral side of the plurality of blades 32 in the radial direction of the rotation axis I. An inner peripheral surface of the rotating support ring 33 forms a part of an inner peripheral surface of the outer peripheral part 13 to be described later. An end part on a radial outer side of each of the blades 32 is fixed to the inner peripheral surface of the rotating support ring 33 via a joint fitting 42. In addition, a permanent magnet 45 of the motor 14 to be described later is held on an outer peripheral surface of the rotating support ring 33.

The rotating part 12 is configured such that the hub 31, the plurality of blades 32, and the rotating support ring 33 are integrally joined, and rotates around the hub 31. In addition, as will be described in detail later, the permanent magnet 45 of the motor 14 is integrally held in the rotating part 12 to form a fan blade rotor 41 in which the rotating part 12 and the permanent magnet 45 are integrated as illustrated in FIG. 2.

The outer peripheral part 13 is provided outside the shaft part 11 in the radial direction, and is the support system (fixed side). The outer peripheral part 13 is a duct that is formed in an annular shape, and is caused to generate thrust by the rotation of the rotating part 12. In the outer peripheral part 13 (hereinafter, referred to as the duct 13), an opening on the upstream side in the axial direction of the rotation axis I is a suction port 38, and an opening on the downstream side is a discharge outlet 39. In addition, the duct 13 has a shape in which when the rotating part 12 rotates, air is suctioned from the suction port 38, and the suctioned air is discharged from the discharge outlet 39 to generate thrust. Specifically, the inner peripheral surface of the duct 13 on the downstream side of the rotating part 12 is a surface that is widened from the suction port 38 side toward the discharge outlet 39 side.

An inside of the duct 13 forms annular internal space that accommodates the rotating support ring 33 of the rotating part 12, the permanent magnet 45 of the motor 14, and a coil 46 of the motor 14 to be described later. The duct 13 holds the coil 46 thereinside at a position where the coil 46 faces the permanent magnet 45 held by the rotating part 12, and the permanent magnet 45 and the coil 46 face each other in the radial direction. Namely, the duct 13 functions as a stator.

The motor 14 is an outer peripheral drive motor that provides power from a duct 13 side toward the rotating part 12 to rotate the rotating part 12. The motor 14 includes a rotor side magnet provided on a rotating part 12 side, and a stator side magnet provided on the duct 13 side. In the first embodiment, the rotor side magnet is the permanent magnet 45, and the stator side magnet is the coil 46 which is an electromagnet.

The permanent magnets 45 are provided to be held on the outer peripheral surface of the rotating support ring 33, and are disposed in an annular shape in the circumferential direction. In addition, the permanent magnets 45 are configured such that positive poles and negative poles alternate at predetermined intervals in the circumferential direction. Incidentally, the permanent magnets 45 may be in a Halbach array. The permanent magnet 45 is provided at a position facing the coil 46 in the radial direction of the rotation axis I.

A plurality of the coils 46 are provided to be held inside the duct 13 and to face the poles of the permanent magnets 45, and are provided side by side in the circumferential direction. The coil 46 is provided at a position to face the permanent magnet 45 held by the rotating part 12, in the radial direction of the rotation axis I. Namely, the permanent magnet 45 and the coil 46 are disposed to face each other in the radial direction of the rotation axis I, which is a radial disposition.

The rolling bearing 15 is provided between the inner peripheral surface of the shaft side fitting part 25 of the shaft part 11 and the outer peripheral surface of the central shaft 36a of the hub 31 of the rotating part 12. The rolling bearing 15 connects the shaft part 11 and the rotating part 12 while allowing the rotating part 12 to rotate with respect to the shaft part 11. The rolling bearing 15 is, for example, a ball bearing or the like.

The guide vane 16 is provided to connect the shaft part 11 and the duct 13. The guide vane 16 is provided downstream of the rotating part 12 in the axial direction of the rotation axis I. Namely, the guide vane 16 is provided at the position of a downstream part 43 of the duct 13 in the axial direction. A plurality of the guide vanes 16 are provided side by side in the circumferential direction of the rotation axis I. In addition, the guide vane 16 has a streamlined shape such as an airfoil shape, and guides air, which flows from the rotating part 12, to generate thrust. Incidentally, the shape of the guide vane 16 is not limited to an airfoil shape, and may be a plate shape.

In the motor-integrated fan 1 described above, power generated by a magnetic field is applied from the duct 13 side to the rotating part 12 by the motor 14, so that the rotating part 12 rotates. When the rotating part 12 rotates, the motor-integrated fan 1 suctions air from the suction port 38, and discharges the air toward the discharge outlet 39. The air discharged from the rotating part 12 flows along the inner peripheral surface of the duct 13 to generate thrust. At this time, the flow of the air is guided by the guide vanes 16, so that thrust is also generated by the guide vanes 16.

(Fan Blade Rotor)

Next, the fan blade rotor 41 in which the rotating part 12 and the permanent magnet 45 are integrated will be described with reference to FIGS. 2 to 4. The fan blade rotor 41 includes the rotating part 12, the permanent magnet 45, and a restraining part 51.

For example, a composite material is used for the restraining part 51, and the restraining part 51 is wound around the rotating support ring 33 and the permanent magnet 45 from outside the rotating support ring 33 of the rotating part 12 and the permanent magnet 45. As the composite material, a material obtained by infiltrating carbon fibers with a resin, for example, a prepreg is applied. In addition, the composite material may be a sheet-shaped material having a narrow width or may be a fiber bundle, and is not particularly limited.

As illustrated in FIG. 3, the restraining part 51 is spirally wound around the rotating support ring 33 and the permanent magnet 45 serving as a core that extend in the circumferential direction, to integrally restrain the rotating support ring 33 and the permanent magnet 45. In addition, as illustrated in FIG. 4, the joint fitting 42 that joins the end part on the radial outer side of the blade 32 to the rotating support ring 33 is provided on an inner peripheral side of the rotating support ring 33, and the restraining part 51 integrally restrains the joint fitting 42 together with the rotating support ring 33 and the permanent magnet 45.

In addition, the restraining part 51 is wound around an entire circumference of the rotating support ring 33. At this time, the restraining part 51 is wound in an overlapping manner in the circumferential direction of the rotating support ring 33. Namely, in the restraining part 51 that is spirally wound in the circumferential direction, one turn of the restraining part 51 on one side and the other turn of the restraining part 51 on the other side that are adjacent to each other overlap each other.

Incidentally, as illustrated in FIG. 3, it is difficult for the restraining part 51 to integrally restrain the joint fitting 42 together with the rotating support ring 33 and the permanent magnet 45 at a joining part at the center of the joint fitting 42 in the circumferential direction. In this case, the restraining part 51 integrally restrains parts of the rotating support ring 33 and of the permanent magnet 45 that correspond to the joining part of the joint fitting 42. Then, the restraining part 51 integrally restrains the joint fitting together with the rotating support ring 33 and the permanent magnet 45 at flat plate parts on both sides of the joint fitting 42 in the circumferential direction. Namely, the restraining part 51 may be configured to be divided into a plurality of parts, and may be configured to include the restraining part 51 that restrains the rotating support ring 33 and the permanent magnet 45 at the joining part of the joint fitting 42, and the restraining parts 51 that restrain the rotating support ring 33, the permanent magnet 45, and the joint fitting 42 at the flat plate parts of the joint fitting 42. In this case, it is preferable that the same composite material is used for the restraining parts 51 which are divided.

Here, a cross section of the rotating support ring and the permanent magnet 45 around which the restraining part 51 is wound will be described with reference to FIG. 5. The rotating support ring 33 is chamfered at corners that are in contact with the restraining part 51. Specifically, the rotating support ring 33 is chamfered at corners that are formed in the inner peripheral side (lower side in FIG. 5) surface on both sides in the axial direction, to form chamfered surfaces.

In addition, a width of the rotating support ring 33 in the axial direction of the rotation axis I (right-left direction in FIG. 5) is wider than a width of the permanent magnet 45 in the axial direction, and the permanent magnet 45 is disposed at the center of the rotating support ring 33 in the axial direction. For this reason, the restraining part 51 is wound around the rotating support ring 33 and the permanent magnet 45 so as not to form an angle smaller than 90°, namely, an acute angle.

As described above, according to the first embodiment, the rotating support ring 33 and the permanent magnet 45 can be integrally restrained by the restraining part 51. For this reason, even when the permanent magnet 45 is disposed on an outer peripheral side of the rotating support ring 33, the configuration can withstand a centrifugal force.

In addition, according to the first embodiment, the composite material is used for the restraining part 51, and the restraining part 51 is wound around the rotating support ring 33 and the permanent magnet 45, so that the rotating support ring 33 and the permanent magnet 45 can be integrally restrained. For this reason, a thickness of the restraining part 51 formed on an outer peripheral side of the permanent magnet 45 can be made thin. Since the thickness of the restraining part 51 is made thin, a gap between the permanent magnet 45 and the coil 46 can be narrowed, and the energy efficiency of the motor 14 can be improved.

In addition, according to the first embodiment, the composite material as the restraining part 51 can be wound around the rotating support ring 33 and the permanent magnet 45 over the entire circumference of the rotating support ring 33. For this reason, when a centrifugal force is generated, hoop stress of the composite material that is spirally wound can be appropriately applied, so that the thickness of the restraining part 51 can be made thinner.

In addition, according to the first embodiment, since the composite material as the restraining part 51 can be wound in an overlapping manner in the circumferential direction of the rotating support ring 33, the strength of the restraining part 51 can be improved.

In addition, according to the first embodiment, since the rotating support ring 33 can be chamfered at the corners that are in contact with the composite material, the stress concentration on the composite material can be reduced, and the cutting of the composite material can be suppressed.

In addition, according to the first embodiment, the permanent magnet 45 can be disposed at the center of the rotating support ring 33 in the axial direction. For this reason, even when the composite material is in contact with the rotating support ring 33 and the permanent magnet 45 and thus are bent, the bending angle can be set to be larger than 90° (obtuse angle). Accordingly, the stress concentration on the composite material can be reduced, and the cutting of the composite material can be suppressed.

Second Embodiment

Figure 6:
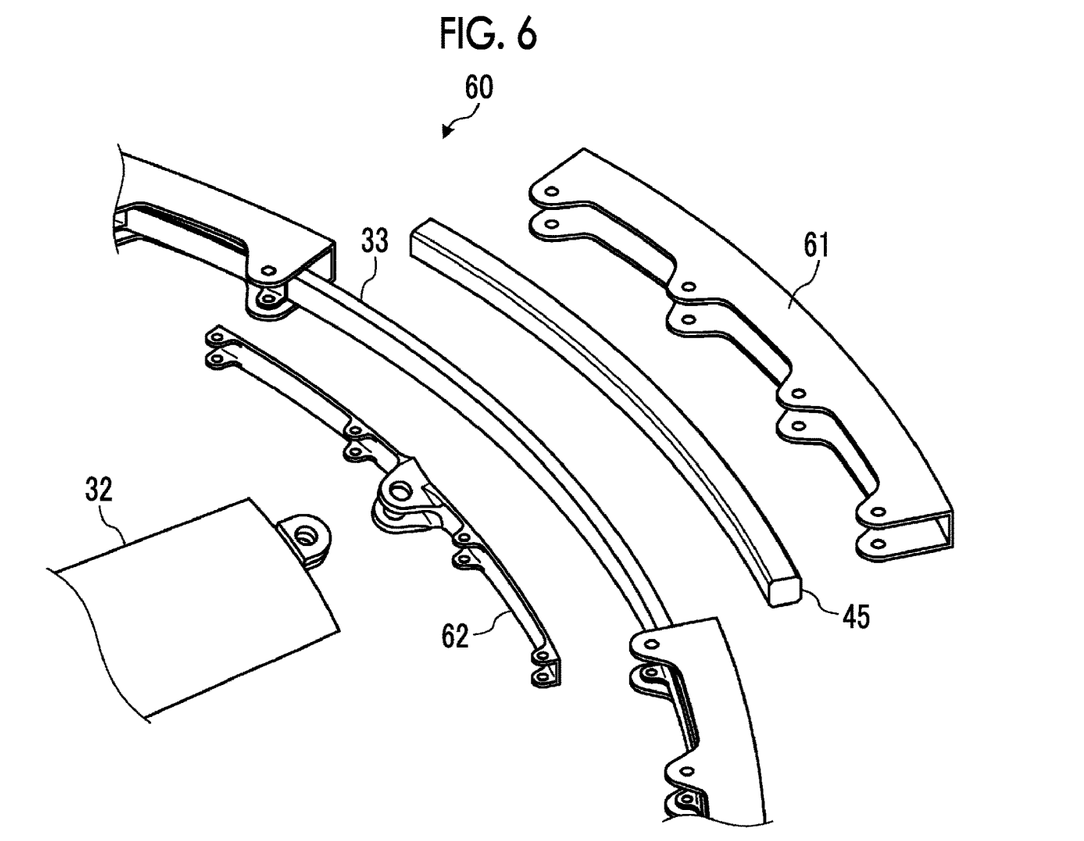
FIG. 6 is a description view illustrating a part of a fan blade of a motor-integrated fan according to a second embodiment.

Next, a motor-integrated fan 60 according to a second embodiment will be described with reference to FIG. 6. Incidentally, in the second embodiment, in order to avoid a duplicated description, parts different from those in the first embodiment will be described, and parts having the same configurations as those in the first embodiment will be described with the same reference signs assigned thereto. FIG. 6 is a description view illustrating a part of a fan blade of the motor-integrated fan according to the second embodiment.

The motor-integrated fan 60 of the second embodiment includes a magnet casing 61 as the restraining part 51 of the motor-integrated fan 1 of the first embodiment, instead of a composite material.

The magnet casing 61 is a casing that covers the rotating support ring 33 and the permanent magnet 45 from the outer peripheral side. In addition, the magnet casing is made of metal. Incidentally, in the second embodiment, metal is used for the magnet casing 61 in consideration of load capacity, workability, and the like, but a composite material, a ceramic material, or the like may be applied, and the material is not particularly limited.

The magnet casing 61 covers the outer peripheral surfaces of the rotating support ring 33 and of the permanent magnet 45, and covers both side surfaces of the rotating support ring 33 and of the permanent magnet 45 in the axial direction. In addition, the magnet casing 61 is fixed to a joint fitting 62 provided on the inner peripheral surface of the rotating support ring 33. Similarly to the first embodiment, the joint fitting 62 fixes the end part on the radial outer side of each of the blades 32 to the rotating support ring 33. The magnet casing 61 and the joint fitting 62 are provided with fastening holes for fastening the magnet casing 61 and the joint fitting 62. The fastening holes are formed in both side surfaces on an inner peripheral side of the magnet casing 61 in the axial direction and in both side surfaces of the joint fitting 62 in the axial direction. The fastening holes are fastened with fastening members such as bolts and nuts to join the magnet casing 61 and the joint fitting 62.

As described above, according to the second embodiment, the rotating support ring 33 and the permanent magnet 45 can be integrally restrained by the magnet casing 61. For this reason, even when the permanent magnet 45 is disposed on an outer peripheral side of the rotating support ring 33, the configuration can withstand a centrifugal force.

Third Embodiment

Figure 7:
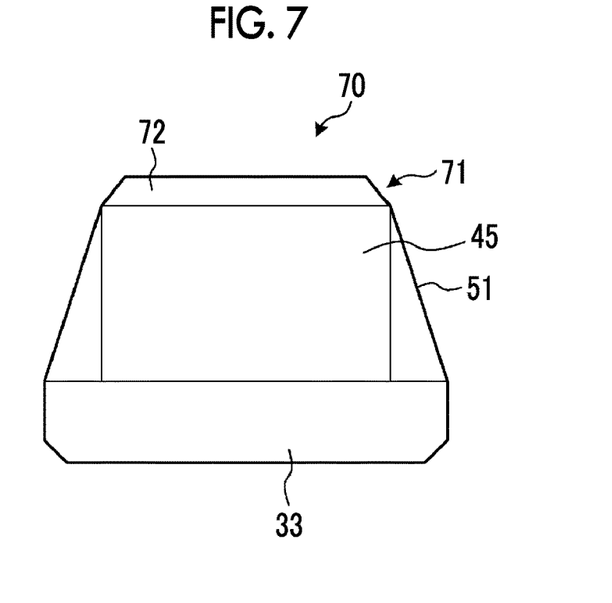
FIG. 7 is a cross-sectional view of a fan blade of a motor-integrated fan according to a third embodiment.

Next, a motor-integrated fan 70 according to a third embodiment will be described with reference to FIG. 7. Incidentally, also in the third embodiment, in order to avoid a duplicated description, parts different from those in the first and second embodiments will be described, and parts having the same configurations as those in the first and second embodiments will be described with the same reference signs assigned thereto. FIG. 7 is a cross-sectional view of a fan blade of the motor-integrated fan according to the third embodiment.

The motor-integrated fan 70 of the third embodiment is configured to further include a restraining ring 72 compared to the motor-integrated fan 1 of the first embodiment. Namely, a fan blade 71 of the motor-integrated fan 70 includes the rotating part 12, the permanent magnet 45, the restraining part 51, and the restraining ring 72. Incidentally, since the rotating part 12, the permanent magnet 45, and the restraining part are substantially the same as those in the first embodiment, a description will be omitted.

The restraining ring 72 is provided on the outer peripheral side of the permanent magnet 45, and is formed in an annular shape. The restraining ring 72 is made of, for example, a composite material such as a prepreg, and is formed such that fiber directions of carbon fibers that are contained are aligned with the circumferential direction. In addition, the restraining part 51 is wound to integrate the rotating support ring 33, the permanent magnet 45, and the restraining ring 72. For this reason, the restraining ring 72 is disposed between the permanent magnet 45 and the restraining part 51 in the radial direction.

In addition, as illustrated in FIG. 7, the restraining ring 72 is chamfered at corners that are in contact with the restraining part 51. Specifically, the restraining ring 72 is chamfered at corners that are formed in an outer peripheral side (upper side in FIG. 7) surface on both sides in the axial direction, to form chamfered surfaces.

As described above, according to the third embodiment, since hoop stress in the circumferential direction can be increased by the restraining ring 72, even when the permanent magnet 45 is disposed on the outer peripheral side of the rotating support ring 33, the configuration can withstand a centrifugal force.

Incidentally, it is preferable that a unidirectional material in which fiber directions of reinforced fibers are aligned in one direction is used as the composite material used for the restraining part 51 of the first and third embodiments. The reason is: stress to be applied when the permanent magnet 45 is restrained is tensile stress, so that a sufficient strength can be obtained with a small winding amount by using a unidirectional material as the composite material.

REFERENCE SIGNS LIST

1 Motor-integrated fan
11 Shaft part
12 Rotating part
13 Duct
14 Motor
15 Rolling bearing
16 Guide vane
31 Hub
32 Blade
33 Rotating support ring
38 Suction port
39 Discharge outlet
41 Fan blade rotor
42 Joint fitting
45 Permanent magnet
46 Coil
51 Restraining part
60 Motor-integrated fan (second embodiment)
61 magnet casing
62 Joint fitting
70 Motor-integrated fan (third embodiment)
71 Fan blade
72 Restraining ring

The invention claimed is:

1. A motor-integrated fluid machine comprising:
a rotatable part configured to rotate around a rotation axis;
an outer peripheral part at an outer periphery of the rotatable part;
an outer peripheral drive motor configured to provide power from the outer peripheral part so as to rotate the rotatable part; and
a restrainer part,
wherein the rotatable part includes:
a rotatable support ring in an annular shape around the rotation axis; and
a plurality of blades on a center side of the rotatable support ring, the plurality of blades being side by side in a circumferential direction of the rotation axis,
wherein the outer peripheral drive motor includes:
a rotor side magnet on an outer peripheral side of the rotatable support ring in a radial direction; and
a stator side magnet on an inner peripheral side of the outer peripheral part, the stator side magnet facing the rotor side magnet, and
wherein:
the restrainer part is wound around the rotatable support ring and configured to restrain the rotatable support ring and the rotor side magnet so as to integrate the rotatable support ring and the rotor side magnet, serving as a core; and
a first length of the restrainer part in a longitudinal direction is longer than a second length of the restrainer part in a width direction.

2. A vertical take-off and landing aircraft comprising:
the motor-integrated fluid machine according to claim 1; and
an airframe configured to be moved by thrust generated from the motor-integrated fluid machine.

3. The motor-integrated fluid machine according to claim 1,
wherein the restrainer part includes a composite material.

4. The motor-integrated fluid machine according to claim 3,
wherein the composite material is wound around the rotatable support ring and the rotor side magnet over an entire circumference of the rotatable support ring.

5. The motor-integrated fluid machine according to claim 3,
wherein the composite material is wound in an overlapping manner in a circumferential direction of the rotatable support ring.

6. The motor-integrated fluid machine according to claim 3,
wherein at least one of the rotatable support ring or the rotor side magnet is chamfered at a corner that is in contact with the composite material.

7. The motor-integrated fluid machine according to claim 3, wherein:
a width of the rotatable support ring in an axial direction is wider than a width of the rotor side magnet in the axial direction; and
the rotor side magnet is at a center of the rotatable support ring in the axial direction.

8. The motor-integrated fluid machine according to claim 3, further comprising:
a restrainer ring in an annular shape on an outer peripheral side opposite to the rotatable support ring with the rotor side magnet interposed between the rotatable support ring and the restrainer ring,
wherein the composite material is wound around the rotatable support ring, the rotor side magnet, and the restrainer ring from outside the rotatable support ring, the rotor side magnet, and the restrainer ring.

* * * * *